United States Patent
Molloy et al.

(10) Patent No.: US 9,940,923 B2
(45) Date of Patent: Apr. 10, 2018

(54) VOICE AND TEXT COMMUNICATION SYSTEM, METHOD AND APPARATUS

(71) Applicant: QUALCOMM Incorporated, San Diego, CA (US)

(72) Inventors: Stephen Molloy, Carlsbad, CA (US); Khaled Helmi El-Maleh, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/981,298

(22) Filed: Dec. 28, 2015

(65) Prior Publication Data

US 2016/0111082 A1    Apr. 21, 2016

Related U.S. Application Data

(62) Division of application No. 11/497,011, filed on Jul. 31, 2006, now abandoned.

(51) Int. Cl.
*G10L 13/00* (2006.01)
*G10L 13/027* (2013.01)
(Continued)

(52) U.S. Cl.
CPC ............ *G10L 13/027* (2013.01); *G10L 13/00* (2013.01); *G10L 15/26* (2013.01); *G10L 19/00* (2013.01);
(Continued)

(58) Field of Classification Search
CPC ..... G10L 15/22; G10L 15/26; G10L 15/1815; G10L 13/033; G10L 13/08;
(Continued)

(56) References Cited

U.S. PATENT DOCUMENTS 5,750,912 A    5/1998 Matsumoto
5,786,768 A *  7/1998 Chan ................... G08B 7/06
                                              340/540
(Continued)

FOREIGN PATENT DOCUMENTS

EP        1511286       3/2005
JP     2007505564 A    3/2007
(Continued)

OTHER PUBLICATIONS

Written Opinion—PCT/US2007/074902, International Search Authority—European Patent Office—dated Jan. 31, 2008 (3 pp.).

(Continued)

*Primary Examiner* — Abdelali Serrou

(74) *Attorney, Agent, or Firm* — Kilpatrick Townsend & Stockton/Qualcomm

(57) ABSTRACT

The disclosure relates to systems, methods and apparatus to convert speech to text and vice versa. One apparatus comprises a vocoder, a speech to text conversion engine, a text to speech conversion engine, and a user interface. The vocoder is operable to convert speech signals into packets and convert packets into speech signals. The speech to text conversion engine is operable to convert speech to text. The text to speech conversion engine is operable to convert text to speech. The user interface is operable to receive a user selection of a mode from among a plurality of modes, wherein a first mode enables the speech to text conversion engine, a second mode enables the text to speech conversion engine, and a third mode enables the speech to text conversion engine and the text to speech conversion engine.

23 Claims, 3 Drawing Sheets

(51) Int. Cl.
*G10L 15/26* (2006.01)
*G10L 19/00* (2013.01)
*G10L 21/0208* (2013.01)

(52) U.S. Cl.
CPC ...... *G10L 19/0019* (2013.01); *G10L 21/0208* (2013.01); *G10L 2021/02082* (2013.01)

(58) Field of Classification Search
CPC ............... G10L 15/1822; G10L 15/24; G10L 2015/0638; G10L 2015/226; G10L 2015/228; G10L 21/013; G10L 19/0019; G10L 21/0208; G10L 2021/02082; G06F 3/167; G06F 17/28; G06F 17/30654
See application file for complete search history.

(56) References Cited

U.S. PATENT DOCUMENTS

| | | | | |
|---|---|---|---|---|
| 5,917,405 | A * | 6/1999 | Joao | B60R 25/018 307/10.2 |
| 5,963,620 | A | 10/1999 | Frankel | |
| 5,983,190 | A * | 11/1999 | Trower, II | G06F 8/00 704/275 |
| 6,094,681 | A * | 7/2000 | Shaffer | G06Q 10/10 709/206 |
| 6,173,250 | B1 | 1/2001 | Jong | |
| 6,195,358 | B1 | 2/2001 | Bowater | |
| 6,237,027 | B1 * | 5/2001 | Namekawa | G06Q 10/107 455/403 |
| 6,366,651 | B1 * | 4/2002 | Griffith | H04L 51/066 379/100.13 |
| 6,456,964 | B2 | 9/2002 | Manjunath | |
| 6,502,073 | B1 | 12/2002 | Guan | |
| 6,574,489 | B1 | 6/2003 | Uriya | |
| 6,745,024 | B1 | 6/2004 | Dejaco | |
| 6,775,360 | B2 * | 8/2004 | Davidson | H04M 1/6505 379/52 |
| 6,795,822 | B1 * | 9/2004 | Matsumoto | G06F 17/2735 |
| 6,845,359 | B2 | 1/2005 | Ramabadran | |
| 6,950,799 | B2 | 9/2005 | Bi | |
| 7,009,990 | B1 * | 3/2006 | Adams | H04L 51/066 370/352 |
| 7,136,811 | B2 | 11/2006 | Tirpak | |
| 7,203,199 | B1 * | 4/2007 | Duree | H04L 12/5602 370/395.6 |
| 7,233,655 | B2 | 6/2007 | Gailey | |
| 7,251,152 | B2 | 7/2007 | Roehr | |
| 7,251,252 | B2 | 7/2007 | Norby | |
| 7,292,878 | B2 | 11/2007 | Noguchi | |
| 7,305,342 | B2 | 12/2007 | Shizuka | |
| 7,406,421 | B2 | 7/2008 | Odinak | |
| 7,464,034 | B2 | 12/2008 | Kawashima | |
| 7,519,042 | B2 | 4/2009 | Gorday | |
| 8,682,360 | B2 * | 3/2014 | Lessing | H04M 1/7255 455/405 |
| 8,989,713 | B2 * | 3/2015 | Doulton | H04L 12/5835 455/413 |
| 9,697,818 | B2 * | 7/2017 | Hendrickson | G10L 13/02 |
| 2002/0184004 | A1 | 12/2002 | Shizuka | |
| 2003/0035412 | A1 * | 2/2003 | Wang | H04L 51/38 370/352 |
| 2003/0083884 | A1 | 5/2003 | Odinak | |
| 2003/0097265 | A1 * | 5/2003 | Sakai | G06F 3/16 704/260 |
| 2004/0034528 | A1 | 2/2004 | Sakai | |
| 2004/0053646 | A1 | 3/2004 | Noguchi | |
| 2004/0098266 | A1 | 5/2004 | Hughes et al. | |
| 2004/0111271 | A1 | 6/2004 | Tischer | |
| 2004/0203448 | A1 | 10/2004 | Nagata | |
| 2005/0058075 | A1 | 3/2005 | Gorday | |
| 2005/0201291 | A1 | 9/2005 | Gluck | |
| 2005/0255837 | A1 * | 11/2005 | Kwon | H04M 1/6505 455/414.4 |
| 2005/0266829 | A1 * | 12/2005 | Tran | H04M 3/537 455/412.1 |
| 2006/0091205 | A1 * | 5/2006 | Agrawal | H04M 3/42263 235/382 |
| 2006/0092015 | A1 * | 5/2006 | Agrawal | G07C 9/00111 340/539.13 |
| 2006/0092874 | A1 * | 5/2006 | Agrawal | H04W 8/18 370/329 |
| 2006/0095265 | A1 | 5/2006 | Chu | |
| 2006/0122840 | A1 | 6/2006 | Anderson | |
| 2006/0136213 | A1 | 6/2006 | Hirose et al. | |
| 2006/0136226 | A1 | 6/2006 | Emam | |
| 2006/0149558 | A1 | 7/2006 | Kahn | |
| 2006/0217159 | A1 * | 9/2006 | Watson | H04M 1/72522 455/563 |
| 2006/0273930 | A1 * | 12/2006 | Godden | G08G 1/0962 340/988 |
| 2007/0036086 | A1 | 2/2007 | Walter | |
| 2007/0043574 | A1 | 2/2007 | Coffman et al. | |
| 2007/0116194 | A1 | 5/2007 | Agapi | |
| 2007/0143103 | A1 | 6/2007 | Asthana | |
| 2010/0030557 | A1 | 2/2010 | Molloy | |

FOREIGN PATENT DOCUMENTS

KR  20020091920     12/2002
WO  2005109661 A1  11/2005

OTHER PUBLICATIONS

International Search Report—PCT/US07/074902—International Search Authority, European Patent Office, dated Jan. 31, 2008 (7 pp.).

* cited by examiner

VOICE AND TEXT COMMUNICATION SYSTEM, METHOD AND APPARATUS

CLAIM OF PRIORITY UNDER 35 U.S.C. §120

The present Application for Patent is a Divisional of patent application Ser. No. 11/497,011 entitled "Enabling multiple modes in a communication device" filed Jul. 31, 2006, pending, and assigned to the assignee hereof and hereby expressly incorporated by reference herein.

TECHNICAL FIELD

The disclosure relates to communications and, more particularly, to a voice and text communication system, method and apparatus.

BACKGROUND

A cellular phone may include an audio capture device, such as a microphone and/or speech synthesizer, and an audio encoder to generate audio packets or frames. The phone may use communication protocol layers and modules to transmit packets across a wireless communication channel to a network or another communication device.

SUMMARY

One aspect relates to an apparatus comprising a vocoder, a speech to text conversion engine, a text to speech conversion engine, and a user interface. The vocoder is operable to convert speech signals into packets and convert packets into speech signals. The speech to text conversion engine is operable to convert speech to text. The text to speech conversion engine is operable to convert text to speech. The user interface is operable to receive a user selection of a mode from among a plurality of modes, wherein a first mode enables the speech to text conversion engine, a second mode enables the text to speech conversion engine, and a third mode enables the speech to text conversion engine and the text to speech conversion engine.

Another aspect relates to an apparatus comprising: a vocoder operable to convert speech signals into packets and convert packets into speech signals; a speech to text conversion engine operable to convert speech to text; a user interface operable to receive a user selection of a mode from among a plurality of modes, wherein a first mode enables the vocoder, and a second mode enables the speech to text conversion engine; and a transceiver operable to wirelessly transmit encoded speech packets and text packets to a communication network.

Another aspect relates to a network apparatus comprising: a vocoder operable to convert packets into speech signals; a speech to text conversion engine operable to convert speech to text; a selection unit operable to switch between first and second modes, wherein the first mode enables the vocoder, and a second mode enables the vocoder and the speech to text conversion engine; and a transceiver operable to wirelessly transmit encoded speech packets and text packets to a communication network.

Another aspect relates to a method comprising: receiving encoded speech packets; converting the received encoded speech packets into speech signals; and receiving a user selection of a mode from among a plurality of modes, wherein a first mode enables speech to text conversion, a second mode enables text to speech conversion, and a third mode enables speech to text and text to speech conversion.

The details of one or more embodiments are set forth in the accompanying drawings and the description below.

DETAILED DESCRIPTION

Receiving a call on a mobile device in a meeting, airplane, train, theater, restaurant, church or other place may be disruptive to others. It may be much less disruptive if a user could select another mode on the mobile device to receive the call and/or respond to the call. In one mode, the device receives the call and converts speech/voice signals to text without requiring the caller on the other end to input text.

Figure 1:
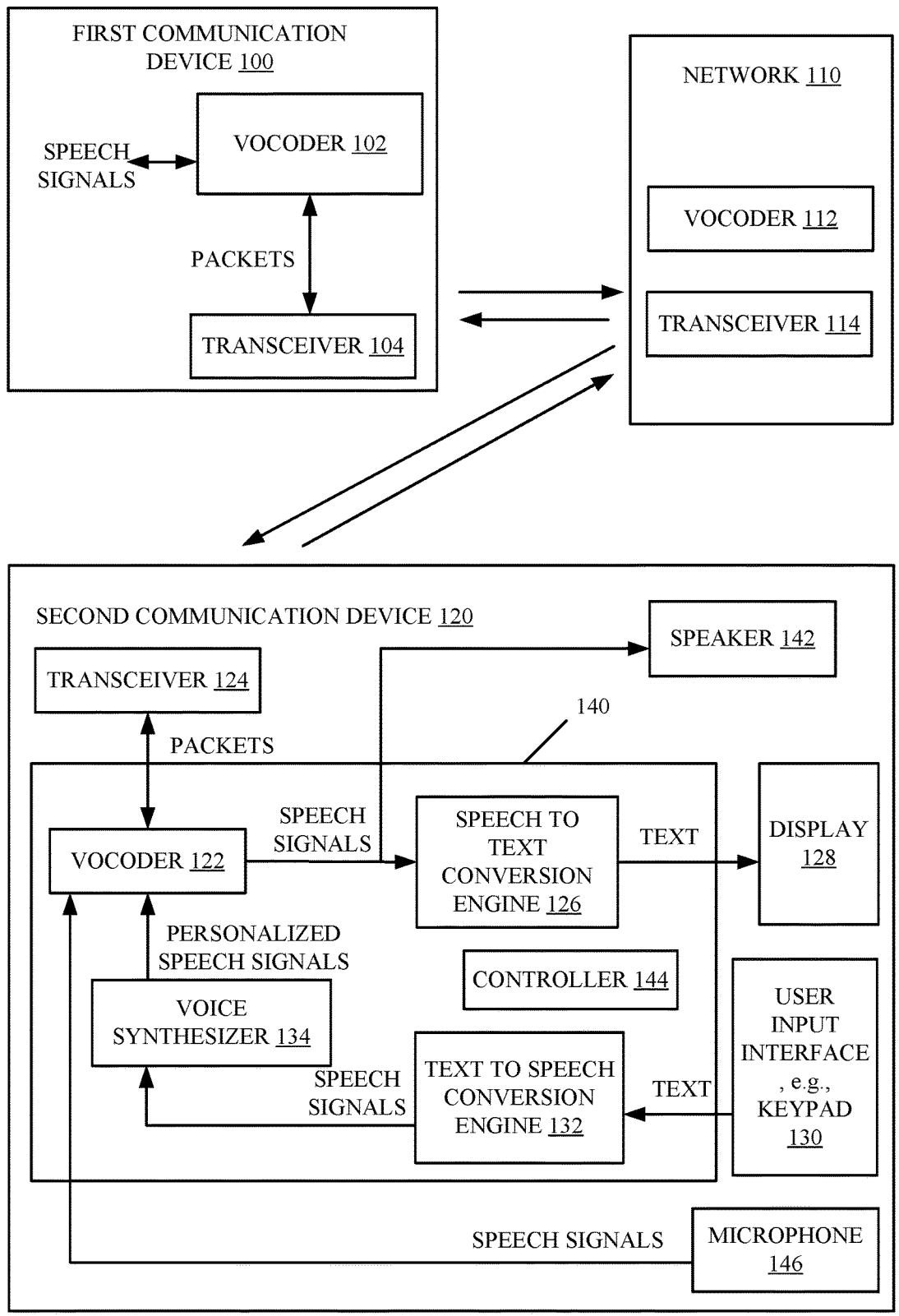
FIG. 1 illustrates a system comprising a first communication device, a network, and a second communication device.

FIG. 1 illustrates a system comprising a first communication device 100, a network 110, and a second communication device 120. The system may include other components. The system may use any type of wireless communication, such as Global System for Mobile communications (GSM), code division multiple access (CDMA), CDMA2000, CDMA2000 1×EV-DO, Wideband CDMA (WCDMA), orthogonal frequency division multiple access (OFDMA), Bluetooth, WiFi, WiMax, etc.

The first communication device 100 comprises a voice coder (vocoder) 102 and a transceiver 104. The first communication device 100 may include other components in addition to or instead of the components shown in FIG. 1. The first communication device 100 may represent or be implemented in a landline (non-wireless) phone, a wireless communication device, a personal digital assistant (PDA), a handheld device, a laptop computer, a desktop computer, a digital camera, a digital recording device, a network-enabled digital television, a mobile phone, a cellular phone, a satellite telephone, a camera phone, a terrestrial-based radiotelephone, a direct two-way communication device (sometimes referred to as a "walkie-talkie"), a camcorder, etc.

The vocoder 102 may include an encoder to encode speech signals into packets and a decoder to decode packets into speech signals. The vocoder 102 may be any type of vocoder, such as an enhanced variable rate coder (EVRC), Adaptive Multi-Rate (AMR), Fourth Generation vocoder (4GV), etc. Vocoders are described in co-assigned U.S. Pat. Nos. 6,397,175, 6,434,519, 6,438,518, 6,449,592, 6,456, 964, 6,477,502, 6,584,438, 6,678,649, 6,691,084, 6,804,218, 6,947,888, which are hereby incorporated by reference.

The transceiver 104 may wirelessly transmit and receive packets containing encoded speech.

The network 110 may represent one or more base stations, base station controllers (BSCs), mobile switching centers (MSCs), etc. If the first device 100 is a landline phone, then network 110 may include components in a plain old telephone service (POTS) network. The network 110 comprises a vocoder 112 and a transceiver 114. The network 110 may include other components in addition to or instead of the components shown in FIG. 1.

The second communication device 120 may represent or be implemented in a wireless communication device, a personal digital assistant (PDA), a handheld device, a laptop computer, a desktop computer, a digital camera, a digital recording device, a network-enabled digital television, a mobile phone, a cellular phone, a satellite telephone, a camera phone, a terrestrial-based radiotelephone, a direct two-way communication device (sometimes referred to as a "walkie-talkie"), a camcorder, etc.

The second communication device 120 comprises a transceiver 124, a speech and text unit 140, a speaker 142, a display 128, a user input interface 130, e.g., a keypad, and a microphone 146. The speech and text unit 140 comprises a vocoder 122, a speech to text conversion engine 126, a controller 144, a text to speech conversion engine 132, and a voice synthesizer 134. The speech and text unit 140 may include other components in addition to or instead of the components shown in FIG. 1.

One or more of the components or functions in the speech and text unit 140 may be integrated into a single module, unit, component, or software. For example, the speech to text conversion engine 126 may be combined with the vocoder 122. The text to speech conversion engine 132 may be combined with the vocoder 122, such that text is converted into encoded speech packets. The voice synthesizer 134 may be combined with the vocoder 122 and/or the text to speech conversion engine 132.

The speech to text conversion engine 126 may convert voice/speech to text. The text to speech conversion engine 132 may convert text to speech. The controller 144 may control operations and parameters of one or more components in the speech and text unit 140.

The device 120 may provide several modes of communication for a user to receive calls and/or respond to calls, as shown in the table below and in FIG. 2.

| Mode | Listen | Speak |
| --- | --- | --- |
| Normal mode | Yes | Yes |
| Second mode | Yes | No - transmit text or synthesized speech |
| Third mode | No - convert incoming speech to text | Yes |
| Fourth mode | No - convert incoming speech to text | No - transmit text or synthesized speech |

In a normal mode (blocks 202 and 210), the user of the second device 120 receives a call from the first device 100, listens to speech from the speaker 142, and speaks into the microphone 146.

Figure 2:
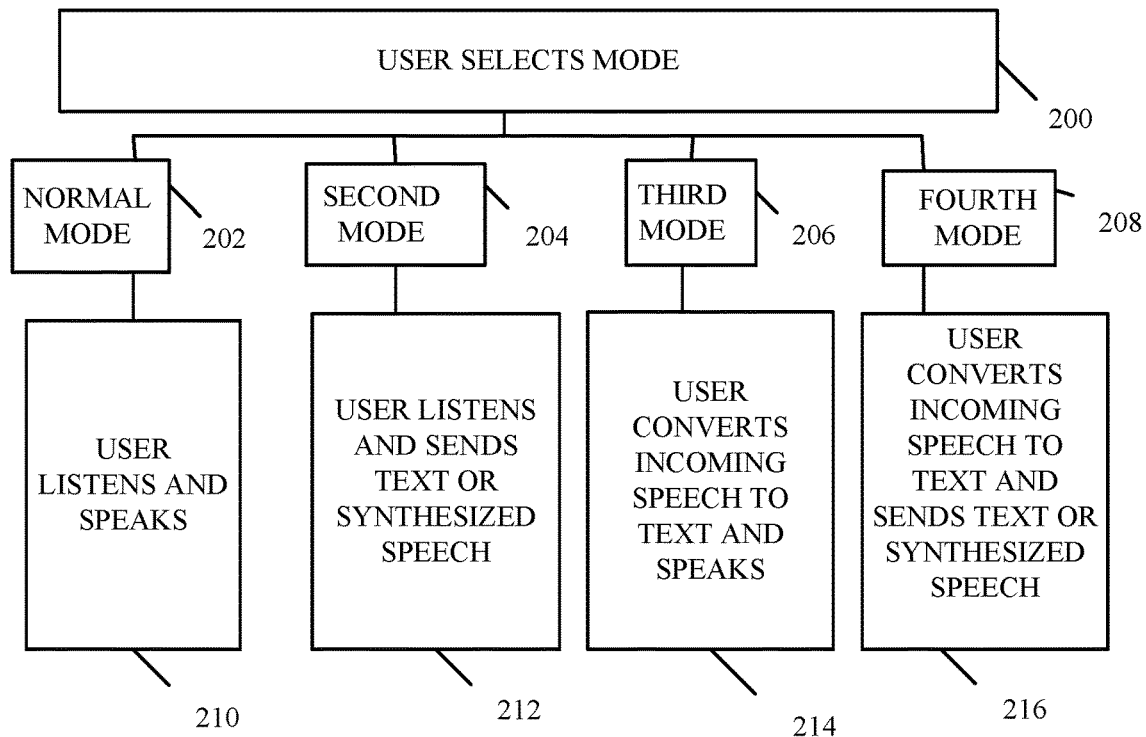
FIG. 2 illustrates a method of using the second device of FIG. 1.

FIG. 2 illustrates a method of using the second device 120 of FIG. 1. When the second device 120 receives a call from the first device 100, a user of the second device 120 can select one of the modes via the user interface 130 in block 200. Alternatively, the user may switch between modes in block 200 before the second device 120 receives a call from another device. For example, if the user of the second device 120 enters a meeting, airplane, train, theater, restaurant, church or other place where incoming calls may be disruptive to others, the user may switch from the normal mode to one of the other three modes.

In a second mode (blocks 204 and 212), the user of the second device 130 may listen to speech from the first device 100, such as using an ear piece, headset, or headphones, but not talk. Instead, the user of the second device 130 may type on the keypad 130 or use a writing stylus to enter handwritten text on the display 128. The display 128 or the text to speech conversion engine 132 may have a module that recognizes handwritten text and characters. The device 120 may (a) send the text to the first device 100 or (b) convert the text to speech with the text to speech conversion engine 132.

The voice synthesizer 134 may synthesize the speech to produce personalized speech signals to substantially match the user's natural voice. The voice synthesizer 134 may include a memory that stores characteristics of the user's voice, such as pitch. A voice synthesizer is described in co-assigned U.S. Pat. No. 6,950,799, which is incorporated by reference. Another voice synthesizer is described in co-assigned U.S. patent application Ser. No. 11/398,364, which is incorporated by reference.

The vocoder 122 encodes the speech into packets. There may or may not be a short delay. In one configuration, other than a short time delay, communication with the second device 120 may appear seamless to the user of the first device 100. If the user of the second device 120 is in a meeting, the conversation may be more message-based than seamless.

In third and fourth modes (blocks 206, 208, 214 and 216), the device 120 receives a call, and the speech to text conversion engine 126 converts speech/voice signals to text for display on the display 128. In one configuration, the third and fourth modes may allow the user of the first device 100 to continue talking and not require the user of the first device 100 to switch to a text input mode. The speech to text conversion engine 126 may include a voice recognition module to recognize words and sounds to convert them to text.

In the third mode, the device 120 allows the user to speak into the microphone 146, which passes speech to the vocoder 122 to encode into packets.

In the fourth mode, the user of the second device 130 may type on the keypad 130 or use a writing stylus to enter handwritten text on the display 128. The device 120 may (a) send the text to the first device 100 or (b) convert the text to speech with the text to speech conversion engine 132. The voice synthesizer 134 may synthesize the speech to produce personalized speech signals to substantially match the user's natural voice. The vocoder 122 encodes the speech into packets.

In the second and fourth modes, if the second device 120 is set to convert text to speech and synthesize speech, there may be a time delay between when the second device 120 accepts a call from the first device 100 and when the first device 100 receives speech packets. The second device 120 may be configured to play a pre-recorded message by the user to inform the first device 100 that the user of the second device 120 is in a meeting and will respond using text to speech conversion.

The second and fourth modes may provide one or more advantages, such as transmitting speech without background noise, no need or reduced need for echo cancellation, no need or reduced need for noise suppression, faster encoding, less processing, etc.

FIG. 1 shows an example where changes (new functions and/or elements) may be implemented in only the second communication device 120. To realize the new modes (second, third and fourth modes) of communication, the second communication device 120 has a vocoder 122, a speech-to-text engine 126, a text-to-speech engine 132, etc. With this device 120, the system can support the new modes without any changes in the network 110 and conventional phones 100 (landline, mobile phones, etc.). The device 120 may receive and send voice packets regardless of the mode selected by the user.

Figure 3:
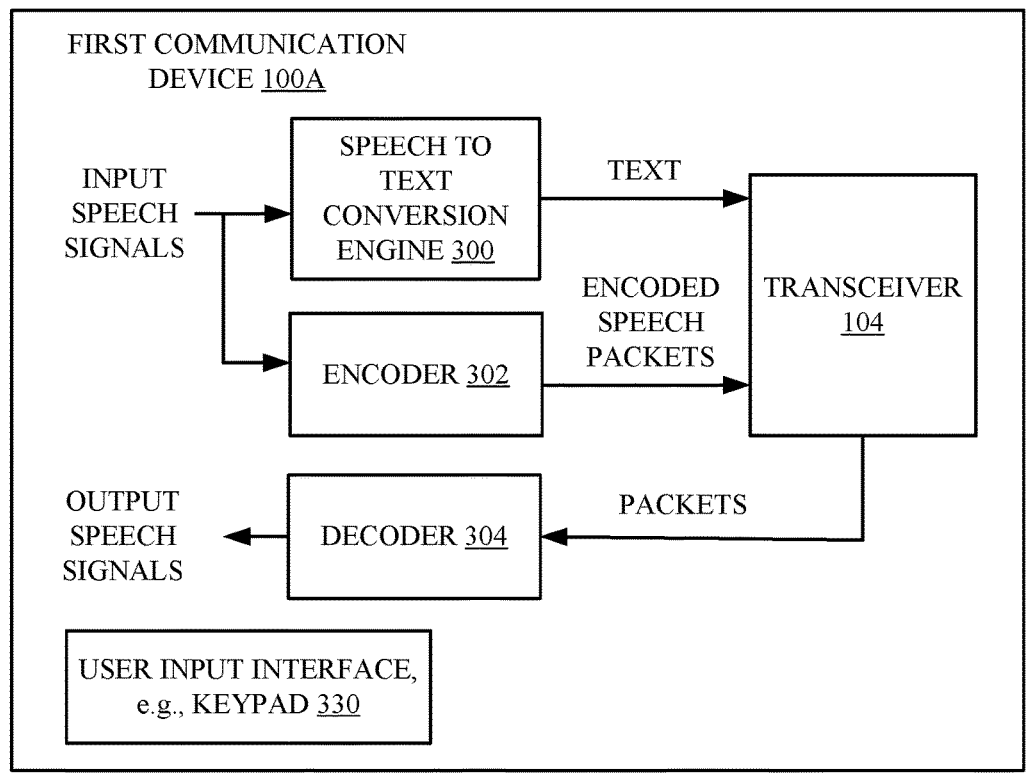
FIG. 3 illustrates another configuration of the first communication device of FIG. 1.

FIG. 3 illustrates another configuration 100A of the first communication device 100 of FIG. 1. In FIG. 3, the first communication device 100A comprises a speech to text conversion engine 300, an encoder 302, a transceiver 104, a decoder 304, and a user interface 330. The speech to text conversion engine 300 may convert voice/speech to text to be transmitted by the transceiver 104 to the network 110. The first communication device 100A of FIG. 3 may allow the second device 120 to be designed without a speech to text conversion engine 126. The first communication device 100A of FIG. 3 may save bandwidth by sending text instead of speech to the network 110. The user interface 330 may be operable to receive a user selection of a mode from among a plurality of modes, wherein a first mode enables the vocoder 302, 304, and a second mode enables the speech to text conversion engine 300.

Figure 4:
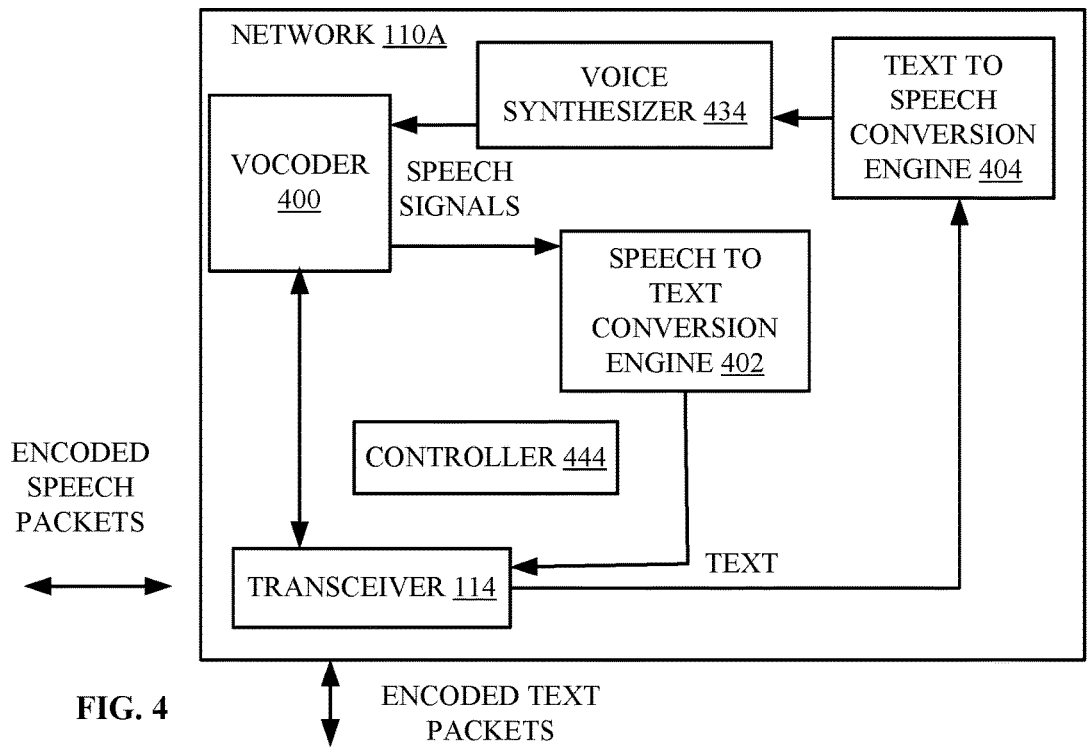
FIG. 4 illustrates another configuration of the network of FIG. 1.

FIG. 4 illustrates another configuration 110A of the network 110 of FIG. 1. In FIG. 4, the network 110A comprises a voice coder/decoder 400, a transceiver 114 and a speech to text conversion engine 402. In another configuration, the network 110A may further comprise a text to speech conversion engine 404, a voice synthesizer 402 and a controller 444. The vocoder 400 decodes speech packets to provide speech signals. The speech to text conversion engine 402 may convert voice/speech to text to be transmitted by the transceiver 114 to the second device 120. The network 110A of FIG. 4 may allow the second device 120 to be designed without a speech to text conversion engine 126 or allow the speech to text conversion engine 126 to be deactivated. The network 110A of FIG. 4 may save bandwidth by sending text instead of speech to the second device 120.

The network 110A in FIG. 4 may acquire knowledge of a configuration, situation or preference of the receiving device 120. If the network 110A realizes that the receiving device 120 will not benefit from receiving voice packets (e.g., sensing a user preference or place of the call, for example, an extremely noisy environment and it is difficult to listen to received speech), then the network 110A will transform voice packets to text packets. Even if the receiving device 120 has the ability to change voice packets to text packets (using a speech-to-text engine 126), it can be a waste of bandwidth and device power to do this transformation (from voice to text) if the user is in a text-receiving mode (a meeting, or silent communication in general).

Thus, the network 110A in FIG. 4 may be used in a system where changes (new features and/or elements) are implemented only in the network 110A, i.e., no changes in communication devices or handsets. The network 110A may take care of changing voice packets into text and vice versa where the mobile handsets do not have speech to text conversion units; or if the mobile handsets do have speech to text conversion units, the handsets prefer not to do the conversion or cannot do the conversion due to a lack of computational resources, battery power, etc.

For example, the first device 100 in FIG. 1 can send\receive voice packets (i.e., first mode), while the second device 120 sends\receives text (i.e., fourth mode). The second device 120 may not have unit 140 (or just have a vocoder 122) or have unit 140 deactivated. To allow the second device 120 to operate in the fourth mode, the network 110A in FIG. 4 will change the first device's voice packets into text packets (using the speech-to-text engine 402) to send to the second device 120 and will change text packets from the second device 120 to voice packets (using the text-to-speech engine 404) to send to the first device 100.

If the second device 120 does not have the unit 140, the second device 120 can signal (in-band for example) a desired mode to the network 110A and thus ask the network 110A to convert between speech and text, i.e., do the functions of unit 140.

Personalized speech synthesis may be done in the network 110A. As described above, the unit 140 in FIG. 1 has a voice synthesizer 134 to change the output of the text-to-speech engine 132 to personalized speech (the user's voice). In a system with the network 110A of FIG. 4, to produce voice packets that carry a voice signature of the user of the second device 120, the second device 120 may send stored voice packets (at the beginning of using second or fourth modes) that have the spectral parameters and pitch information of the user to the network 110A. These few transmitted voice packets (preceding the text packets) can be used by the network 110A to produce personalized voice packets.

An example of transmitting packets for second or fourth modes from the second device 120 to the network 110A is described. The second device 120 transmits to the network 110A at the beginning of using these "text modes" (second or fourth modes) user pre-stored voice packets (N packets) plus a mode of operation (1, 2, 3, or 4; request to do the conversion). The second device 120 may then send text packets.

A combination of the two configurations (FIG. 1 and FIG. 4) is also possible. When using one of these modes, the network 110A will enable the text\speech conversion after sensing (e.g., receiving a request via signaling) the capability of the receiving device 120, which does the conversion or lets the network 110A or receiving device 100A does the conversion.

One or more components and features described above may be implemented in a push to talk (PTT) or push to read communication device. A PTT device allows a user to push a button on the device and talk, while the device converts speech to text and transmits text packets to a network or directly to another communication device. PTT communication is "message based," rather than continuous, such as a standard voice call. A time period over which a user holds down the PTT button on the device may nicely frame the message that is then converted to text, etc.

The device 120 may have a dedicated memory for storing instructions and data, as well as dedicated hardware, software, firmware, or combinations thereof. If implemented in software, the techniques may be embodied as instructions on a computer-readable medium such as random access memory (RAM), read-only memory (ROM), non-volatile random access memory (NVRAM), electrically erasable programmable read-only memory (EEPROM), FLASH memory, or the like. The instructions cause one or more processors to perform certain aspects of the functionality described in this disclosure.

The techniques described in this disclosure may be implemented within a general purpose microprocessor, digital signal processor (DSP), application specific integrated circuit (ASIC), field programmable gate array (FPGA), or other equivalent logic devices. For example, the speech and text unit 140 and associated components and modules, may be implemented as parts of an encoding process, or coding/decoding (CODEC) process, running on a digital signal processor (DSP) or other processing device. Accordingly, components described as modules may form programmable features of such a process, or a separate process.

The speech and text unit 140 may have a dedicated memory for storing instructions and data, as well as dedicated hardware, software, firmware, or combinations thereof. If implemented in software, the techniques may be embodied as instructions executable by one or more processors. The instructions may be stored on a computer-readable medium such as random access memory (RAM), read-only memory (ROM), non-volatile random access memory (NVRAM), electrically erasable programmable read-only memory (EEPROM), FLASH memory, magnetic or optical data storage device, or the like. The instructions cause one or more processors to perform certain aspects of the functionality described in this disclosure.

Various embodiments have been described. These and other embodiments are within the scope of the following claims.

The invention claimed is:

1. An apparatus for wireless communications, said apparatus comprising:
   a module configured to, when a mobile communications device has been set to a first mode in which said mobile communications device accepts text input instead of speech input, receive text that has been entered by a user of said mobile communications device and to convert the received text to a synthesized speech signal during a call in which a second communications device is configured to receive speech packets, wherein said mobile communications device is settable to a second mode in which said mobile communications device accepts speech input instead of text input;
   a vocoder configured to encode the synthesized speech signal to produce a plurality of corresponding speech packets; and
   a transceiver configured to transmit the plurality of corresponding speech packets over a wireless communications link to said second communications device,
   wherein said module includes a voice synthesizer configured to store characteristics of a voice of the user and to use said stored characteristics to produce the synthesized speech signal,
   wherein said apparatus is configured to transmit, via said transceiver, an audio notification informing said second communications device that speech from said mobile communications device following said audio notification will be converted from text, and
   wherein said apparatus is configured to transmit said audio notification prior to transmitting said plurality of corresponding speech packets.

2. The apparatus according to claim 1, wherein said module includes a text-to-speech conversion engine configured to convert said received text to a speech signal, and
   wherein said voice synthesizer is arranged to produce the synthesized speech signal from said speech signal.

3. The apparatus according to claim 1, wherein the mobile communications device includes said apparatus.

4. The apparatus according to claim 3, wherein said stored characteristics include pitch.

5. The apparatus according to claim 3, wherein said apparatus is configured to receive said text via at least one among a keypad and a display.

6. The apparatus according to claim 1, wherein said audio notification is recorded prior to said receiving said entered text.

7. The apparatus according to claim 1, wherein said apparatus comprises a memory configured to store said audio notification, and
   wherein said audio notification is stored within said memory prior to said receiving said entered text.

8. The apparatus according to claim 1, wherein said audio notification is already recorded within the apparatus when said text is received.

9. The apparatus according to claim 3, wherein said apparatus includes a microphone, and
   wherein, in a said second mode, said apparatus is configured to receive a speech signal from a microphone, and to produce encoded speech packets based on said received speech signal, and
   wherein, in said first mode, said apparatus is configured to convert said received text to said synthesized speech signal, and to encode said synthesized speech signal to produce said plurality of corresponding speech packets, without performing echo cancellation on said synthesized speech signal.

10. The apparatus according to claim 3, wherein said apparatus includes a microphone, and
    wherein, in said second mode, said apparatus is configured to receive a speech signal from a microphone, and to produce encoded speech packets based on said received speech signal, and
    wherein, in said first mode, said apparatus is configured to convert said received text to said synthesized speech signal, and to encode said synthesized speech signal to produce said plurality of corresponding speech packets, without performing noise suppression on said synthesized speech signal.

11. The apparatus according to claim 1, wherein said apparatus is arranged to receive said text via said transceiver.

12. The apparatus according to claim 11, wherein said apparatus is configured to receive said text in the form of text packets.

13. The apparatus according to claim 11, wherein said apparatus is configured to receive voice packets that have said characteristics of the voice of the user and to store said characteristics.

14. The apparatus according to claim 13, wherein said apparatus is configured to store said characteristics prior to receiving said text packets.

15. The apparatus according to claim 13, wherein said stored characteristics include spectral parameters and pitch information of the user.

16. A method for wireless communications, said method comprising:
    receiving text that has been entered by a user of a mobile communications device wherein said text is received when said mobile communications device has been set to a first mode in which said mobile communications device accepts text input instead of speech input, wherein said text is received during a call in which a second communications device is configured to receive speech packets, and wherein said mobile communications device is settable to a second mode in which said mobile communications device accepts speech input instead of text input;
    converting the received text to a synthesized speech signal;
    encoding the synthesized speech signal to produce a plurality of corresponding speech packets;
    transmitting the plurality of corresponding speech packets over a wireless communications link to said second communications device; and
    transmitting an audio notification informing said second communications device that speech from said mobile communications device following said audio notification will be converted from text, wherein said audio notification is transmitted prior to transmitting said plurality of corresponding speech packets, and wherein said converting the received text to the synthesized speech signal includes using stored characteristics of the user's voice to produce the synthesized speech signal.

17. The method according to claim 16, wherein said method includes, in said second mode, receiving a speech signal from a microphone, and producing encoded speech packets based on said received speech signal, and
wherein said method includes, in said first mode, converting said received text to said synthesized speech signal, and encoding said synthesized speech signal to produce said plurality of corresponding speech packets, without performing echo cancellation on said synthesized speech signal.

18. The method according to claim 16, wherein said method includes, in said second mode, receiving a speech signal from a microphone, and producing encoded speech packets based on said received speech signal, and
wherein said method includes, in said first mode, converting said received text to said synthesized speech signal, and encoding said synthesized speech signal to produce said plurality of corresponding speech packets, without performing noise suppression on said synthesized speech signal.

19. The method according to claim 16, wherein said transmitting comprises transmitting the plurality of corresponding speech packets over the wireless communications link via a transceiver, and
wherein said method comprises receiving said text via the transceiver.

20. A non-transitory computer-readable medium comprising instructions which when executed by a processor cause the processor to:
receive text that has been entered by a user of a mobile communications device, wherein said text is received when said mobile communications device has been set to a first mode in which said mobile communications device accepts text input instead of speech input, wherein said text is received during a call in which a second communications device is configured to receive speech packets, and wherein said mobile communications device is settable to a second mode in which said mobile communications device accepts speech input instead of text input;
convert the received text to a synthesized speech signal;
encode the synthesized speech signal to produce a plurality of corresponding speech packets;
transmit the plurality of corresponding speech packets over a wireless communications link to said second communications device; and
transmit an audio notification informing said second communications device that speech from said mobile communications device following said audio notification will be converted from text, wherein said audio notification is transmitted prior to transmitting said plurality of corresponding speech packets, and wherein said converting the received text to the synthesized speech signal includes using stored characteristics of the user's voice to produce the synthesized speech signal.

21. The medium according to claim 20, wherein said medium includes instructions which when executed by the processor cause the processor to, in said second mode, receive a speech signal from a microphone, and produce encoded speech packets based on said received speech signal, and
wherein said medium includes instructions which when executed by the processor cause the processor to, in said first mode, convert said received text to said synthesized speech signal, and encode said synthesized speech signal to produce said plurality of corresponding speech packets, without performing echo cancellation on said synthesized speech signal.

22. The medium according to claim 20, wherein said medium includes instructions which when executed by the processor cause the processor to, in said second mode, receive a speech signal from a microphone, and produce encoded speech packets based on said received speech signal, and
wherein said medium includes instructions which when executed by the processor cause the processor to, in said first mode, convert said received text to said synthesized speech signal, and encode said synthesized speech signal to produce said plurality of corresponding speech packets, without performing noise suppression on said synthesized speech signal.

23. The medium according to claim 20, wherein said transmitting comprises transmitting the plurality of corresponding speech packets over the wireless communications link via a transceiver, and
wherein said medium includes instructions which when executed by the processor cause the processor to receive said text via the transceiver.

* * * * *